United States Patent
Westenberger et al.

(10) Patent No.: US 8,439,392 B2
(45) Date of Patent: May 14, 2013

(54) MOTOR VEHICLE BODY WITH SIDE AIRBAG SYSTEM

(75) Inventors: Claus Westenberger, Lindenfels (DE); Gunther Heim, Lampertheim (DE); Hamid Yazdandoost, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/081,234

(22) Filed: Apr. 6, 2011

(65) Prior Publication Data

US 2011/0248483 A1    Oct. 13, 2011

(30) Foreign Application Priority Data

Apr. 7, 2010  (DE) .......................... 10 2010 014 050

(51) Int. Cl.
*B60R 21/16* (2006.01)
(52) U.S. Cl.
USPC .................................. 280/728.2; 280/730.2
(58) Field of Classification Search .............. 280/730.2, 280/728.2
See application file for complete search history.

(56) References Cited

U.S. PATENT DOCUMENTS

| | | | |
|---|---|---|---|
| 6,158,767 A | 12/2000 | Sinnhuber | |
| 6,227,561 B1 | 5/2001 | Jost et al. | |
| 6,257,616 B1 | 7/2001 | Nowak et al. | |
| 6,340,169 B1 | 1/2002 | Tietze | |
| 6,364,343 B1 | 4/2002 | Slota et al. | |
| 6,485,048 B2 * | 11/2002 | Tajima et al. | 280/728.2 |
| 6,543,804 B2 * | 4/2003 | Fischer | 280/730.2 |
| 7,213,839 B2 | 5/2007 | Lockwood | |
| 7,246,817 B2 | 7/2007 | Tanase | |
| 2003/0178820 A1 * | 9/2003 | Green et al. | 280/730.2 |
| 2008/0001384 A1 | 1/2008 | Catron et al. | |

FOREIGN PATENT DOCUMENTS

| | | |
|---|---|---|
| DE | 69903243 T2 | 6/2003 |
| DE | 102004037852 A1 | 3/2005 |
| DE | 102004007282 A1 | 9/2005 |
| DE | 102004018315 A1 | 12/2005 |
| DE | 102007029890 A1 | 1/2009 |
| EP | 1884411 A1 | 2/2008 |

OTHER PUBLICATIONS

German Patent Office, German Search Report for German Application No. 102010014050.3, dated Mar. 15, 2011.
British Patent Office, Search Report for British Application No. GB1105799.9, dated Aug. 2, 2011.

* cited by examiner

*Primary Examiner* — Eric Culbreth
(74) *Attorney, Agent, or Firm* — Ingrassia Fisher & Lorenz, P.C.

(57) ABSTRACT

A motor vehicle body is provided with a side airbag system that has a gas generator of the side airbag system and a handle mounted adjacently to a side window. The gas generator is inserted in a mounting frame between the handle and the roof frame, which connects the handle to a roof frame of the body.

10 Claims, 3 Drawing Sheets

MOTOR VEHICLE BODY WITH SIDE AIRBAG SYSTEM

CROSS-REFERENCE TO RELATED APPLICATION

This application claims priority to German Patent Application No. 102010014050.3, filed Apr. 7, 2010, which is incorporated herein by reference in its entirety.

TECHNICAL FIELD

The technical field relates to a motor vehicle body with a side airbag system, which serves to prevent that an occupant of the motor vehicle strikes a side window or body parts adjacent to the latter with his head in the event of an accident.

BACKGROUND

A motor vehicle body with side airbag system is known for example from U.S. Pat. No. 6,158,767 A. This conventional side airbag system comprises a plurality of airbags which are accommodated in a channel that is open towards the bottom on a roof frame of the vehicle body and are supplied by gas generators which are mounted on the upper end of a B-pillar or on the foot of an A-pillar of the body. The channel impairs the stability of an anchorage of a handle mounted on the roof frame. The mounting of the gas generators and of the handle requires a lot of work and a large number of individual parts.

Therefore, at least one object is to state a motor vehicle body that allows simplified mounting of a side airbag system and of a handle on a roof frame. In addition, other objects, desirable features and characteristics will become apparent from the subsequent summary and detailed description, and the appended claims, taken in conjunction with the accompanying drawings and this background.

SUMMARY

A motor vehicle body is provided having a side airbag system. A gas generator of the side airbag system and a handle are mounted adjacently to a side window, and the gas generator is inserted between the handle and the roof frame of the body in a mounting frame connecting the handle to a roof frame. Thus, through the attachment of the handle and its mounting frame on the roof frame the place of installation for the gas generator is created. It is not necessary to mount a separate mounting frame for the gas generator in a separate operation as a result of which working time and fastening parts can be saved.

The mounting frame can comprise a base plate which in the installed state faces the passenger cell on which the handle is fastened, two first feet offset against the base plate for fastening to the roof frame and wall portions connecting the feet to the base plate. A clearance accommodating the gas generator is preferentially formed in at least one of the wall portions. The clearance facilitates the insertion of the gas generator after the attachment of the handle and mounting frame to the roof frame. A clamping strap wrapped about the gas generator can serve for the final fixing.

A rail extending in longitudinal direction of the gas generator can form an extended contact surface or at least contact points spaced far from one another through which an installation position of the gas generator is exactly determined. In order to fix the gas generator to the rail the clamping strap can be wrapped about the gas generator and the rail. In order to reduce the number of the individual parts to be mounted, the rail and the clamping strap are preferentially formed continuously in one piece.

It is also preferable that the mounting frame is constructed in two parts with a first frame part connecting the handle to the body and a second frame part on which the gas generator is fixed. The frame parts are not necessarily interconnected in a fixed manner but at least so interlaced so that they can be jointly mounted to the roof frame in a single operation. If the abovementioned base plate, the wall portions and the first feet are part of the first frame part, the second frame part for this purpose practically comprises second feet which, when fastened to the roof frame, bear against the first feet. To this end, a first and a second foot each are preferentially fastened to the roof frame by a common screw.

A rail of the second frame part, which more preferably can be the abovementioned rail, can cross the two edge portions of the first frame part and in the process more preferably run through its clearances. A connecting piece between the rail and one of the second feet preferentially rests on an upper edge of one of the first feet so that when the two frame parts are held in an orientation suitable for mounting, the second frame part rests on the first one in a stable manner, even without both being interconnected in a fixed manner.

Airbags fed by the gas generator can be arranged on opposite sides of the gas generator. Thus, despite the central positioning of the gas generator behind the handle, the side window can be completely covered by airbags before and behind the handle when required. In order to provide continuous protection an airbag of the system can also extend along a pillar, more preferably an A-pillar of the body.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to application and uses. Furthermore, there is no intention to be bound by any theory presented in the preceding background or summary or the following detailed description.

Figure 1:
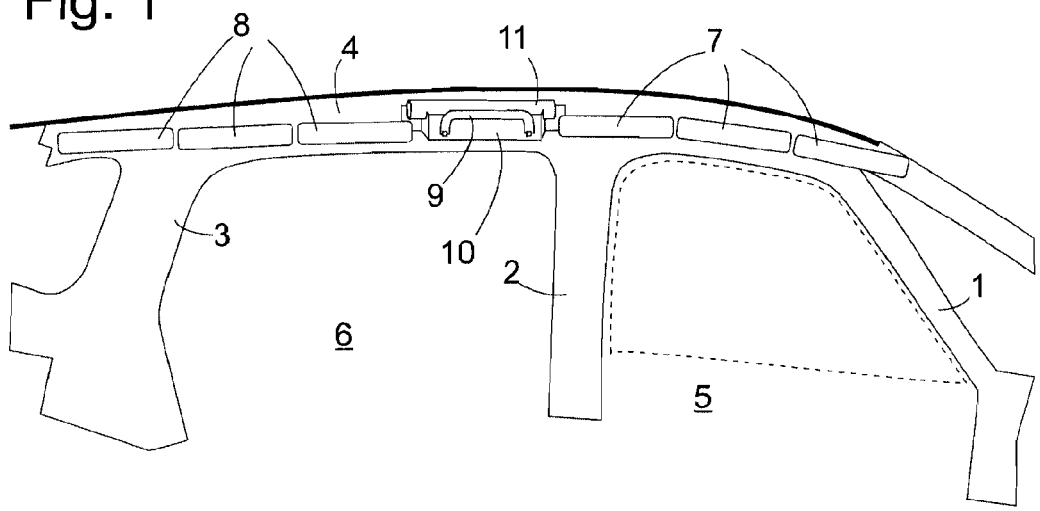
FIG. 1 is a part view of a motor vehicle body according to a first embodiment.

FIG. 1, in a schematic view, seen out of the passenger cell, shows A, B and C-pillars 1, 2, 3 of a motor vehicle body and a roof frame 4 connecting the upper ends of the pillars 1, 2, 3. The body has front and rear door openings 5, 6. In the front door opening 5 the outline of a side window is drawn in interrupted line. On the roof frame 4 a plurality of airbags 7, 8 are mounted above the door openings 5, 6. A handle 9 above the rear door opening 6 divides the airbags into a front group 7 and a rear group 8. Both groups substantially extend over the same length or comprise the same number of airbags. The handle 9 is fastened to the roof frame 4 by means of a mounting frame 10, which simultaneously also carries a gas generator 11 for supplying the airbags 7, 8.

Figure 2:
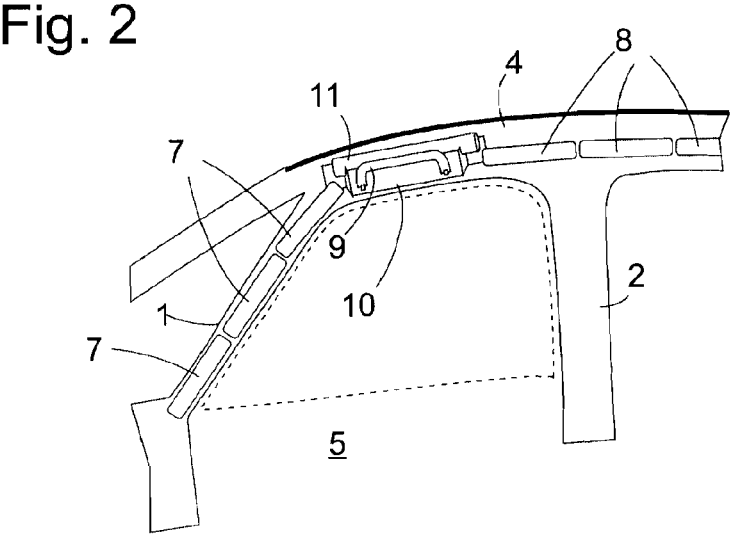
FIG. 2 is a part view similar to FIG. 1 according to a second embodiment.

FIG. 2 in a view similar to FIG. 1 shows a part of a motor vehicle body according to second embodiment. A rear door opening is not shown here, it can either be present or not. The handle 9, the frame 10 and the gas generator 11 are located above the front door opening 5. The front gas generators 7 extend from the roof frame 4 along the A-pillar 1; the rear gas generators reach along the roof frame at least as far as to the B-pillar 2. Handle 9, frame 10 and gas generator 11 are identically constructed with those shown in FIG. 1.

Figure 3:
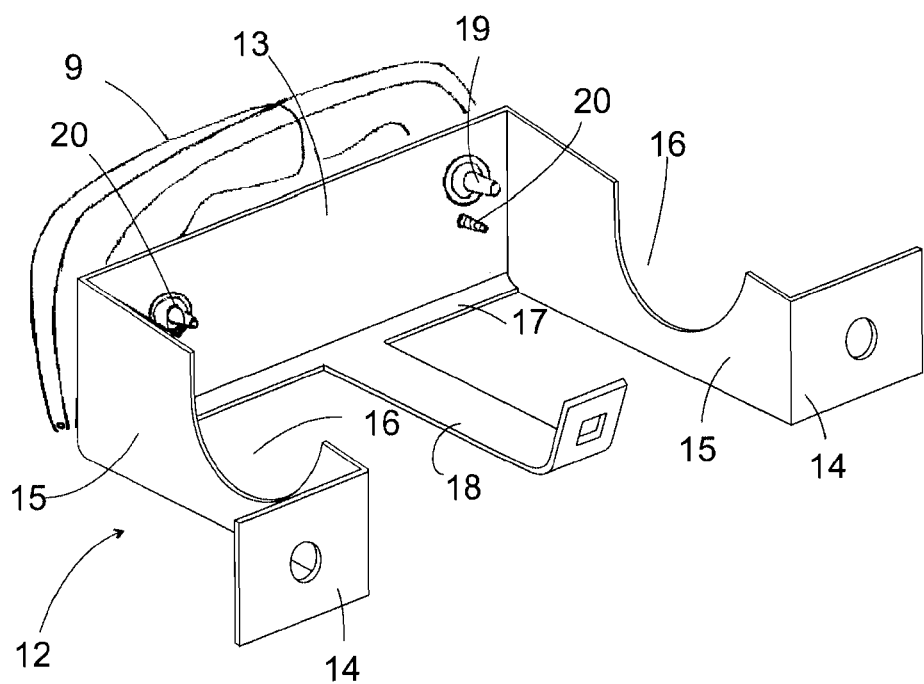
FIG. 3 is a perspective view of a first frame part used for fastening a handle to a roof frame of the body according to FIG. 1 or FIG. 2.

FIG. 3 shows a first frame part 12 of the mounting frame 10 in a perspective view. The frame part 12 formed of steel plate comprises a base plate 13 which in the state mounted to the roof frame 4 faces the passenger cell, two plate-shaped feet 14 offset parallel to the base plate 13 and wall portions 15 which unitarily join the base plate to the feet 14. The wall portions 15 each have a clearance 16 that is open towards the top and approximately semi-circular in shape. The base plate 13 is stiffened by a rounding-off at its lower edge 17. A strap 18 standing away from the lower edge, which at its free end comprises a further foot for fastening to the roof frame 4, can serve for the further stabilization of the frame part 12. The handle 9 in a manner known per se can be pivoted against a base concealed behind the base plate 13 in FIG. 1. The base is positioned in the base plate 13 with the help of pins 19 which penetrate bores of the base plate 13 and are fastened by sheet metal screws 20.

Figure 4:
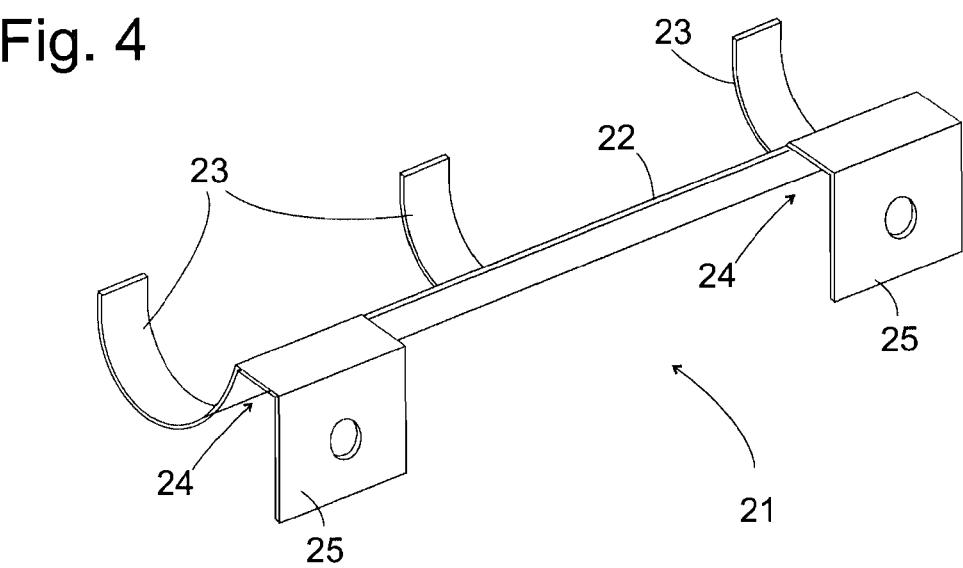
FIG. 4 is a perspective view of a second frame part provided as holder for a gas generator.

A second frame part 21 shown in FIG. 4 serves as holder of the gas generator 11 (not shown). It comprises an elongated rail 22 from the lower edge of which a plurality of tongues 23 stand away. The tongues 23 are curved in the shape of a semicircle over an angle of more than approximately 180° with a slightly smaller diameter than the gas generator 11 in order to elastically clamp the latter. From an upper edge of the rail 22 two L-shaped angled hooks 24 stand away, whose vertical leg distant from the rail 22 likewise forms a foot 25 for the fastening of the second frame part 21 on the roof frame 4 and is substantially congruent with a foot 14 of the first frame part 12.

Figure 5:
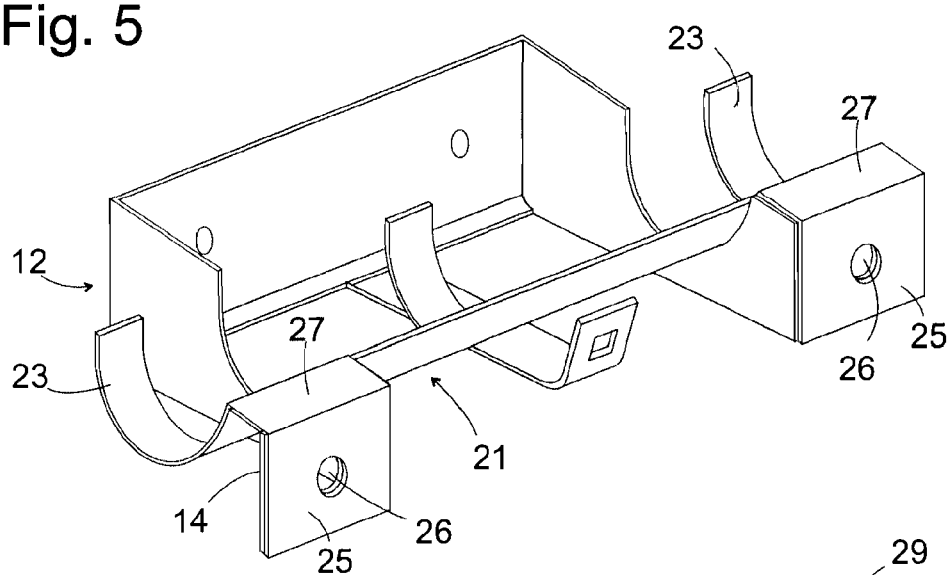
FIG. 5 is the two frame parts in the state joined into each other.

FIG. 5 shows the frame parts 12, 21 in a configuration joined into each other. Proximal legs 27 of the hooks 24 rest on the upper edges of the feet 14, the feet 14, 25 touch each other and fastening holes 26 of the feet 14, 25 are aligned with each other. In this configuration the two frame parts 12, 21 can be mounted to the roof frame 4 in a single operation in that they are screwed to the roof frame 4 with the help of screws extending through the fastening holes 26 which are not shown. In the process, the feet 25 of the second frame part 21 are clamped in between the feet 14 of the first frame part 12 and the roof frame 4.

The gas generator 11 can be placed in a mounting frame 10 mounted thus in that it is pushed into the clearances 16 from the top until it engages in the tongues 23 or, if the spacing between the base plate 13 and the vehicle roof is not adequate for this, in that it is pushed between the tongues 23 and into the clearances 16 in longitudinal direction.

Figure 6:
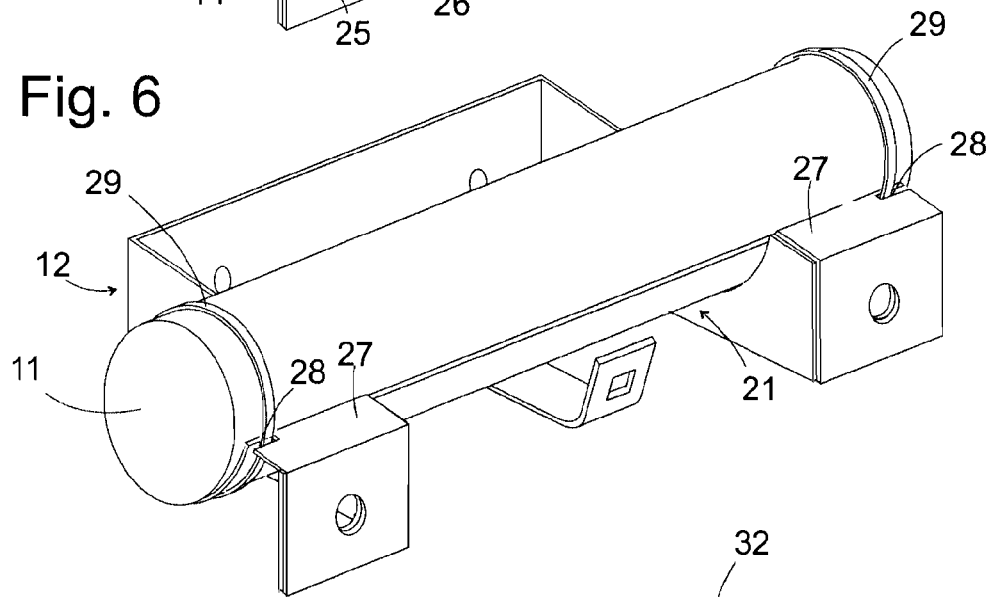
FIG. 6 is the two frame parts according to a first modification, together with a gas generator fixed therein.

FIG. 6 shows the mounting frame 10 with the gas generator 11 fixed therein according to another embodiment. The proximal legs 27 of the second frame part 21 in this case are provided with an opening or notch 28 through which a holding strap, for example a cable tie 29 extends. By tensioning the cable tie 29 the gas generator 11 is sustainably fixed on the second frame part 21. The elastic tongues 23 can support the gas generator 11 also with this configuration, but if they are absent, the cable ties 29 however are adequate to securely fix the gas generator 11 in the shown position.

Figure 7:
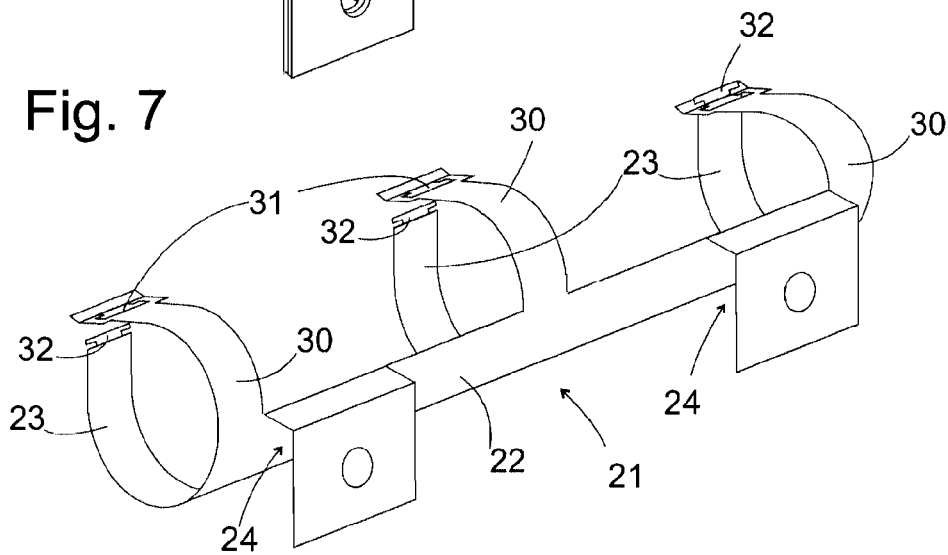
FIG. 7 is a second frame part according to a further modification.

A third configuration of the second frame part 21 is shown in FIG. 7 in a schematic view. The hooks 24 are the same as with the configurations of FIG. 4 and FIG. 6. The rail 22 in this case is extended slightly beyond the hooks 24 and the tongues 23 are offset in longitudinal direction of the rail 22 against the hooks 24. Because of this it is possible to form additional tongues on the frame part 21 unitarily cut to size and shaped from sheet metal to form tongues 30 located opposite the tongues 23 on the upper edge of the rail 22. These tongues 30 at their free end are provided with an eye 31 with a flat T-shaped cross section. The tips 32 of the tongues 32 to this end have a complementary T-shape, which allows latching the tip 32 in the eye 31 under tension as is shown in FIG. 7 on the example of the rear-most pair of tongues 23, 30. The mounting of the gas generator 11 is performed in that, after the second frame part 21 has been joined together with the first frame part 12 of FIG. 3 and mounted to the roof frame, it is pushed in longitudinal direction of the rail 22 between the as yet unconnected tongues 23, 30 and subsequently clamped into the eyes 31 of the gas generator 11 through inter-latching of the tips 32.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle with side airbag system, comprising:
a gas generator mounted adjacently to a side window;
a handle mounted adjacently to the side window; and
a mounting frame configured to receive the gas generator and connect the handle to a roof frame of a body with the gas generator inserted between the handle and the roof frame, the gas generator fixed on the mounting frame with a wrapped-around clamping strap,
wherein airbags fed by the gas generator are arranged on opposite ends of the gas generator and the mounting frame comprises a rail extending in a longitudinal direction of the gas generator on which the gas generator is fixed through the wrapped-around clamping strap.

2. The motor vehicle according to claim 1, further comprising:
a base plate of the mounting frame on which the handle is fastened; and
two first feet that are offset against the base plate that are fastened to the roof frame and wall portions connecting the two first feet to the base plate.

3. The motor vehicle according to claim 2, wherein a clearance is formed in at least one of the wall portions accommodating the gas generator .

4. The motor vehicle according to claim 2, further comprising a first frame part of the mounting frame that connects the handle to the body and a second frame part on which the gas generator is fixed.

5. The motor vehicle according to claim 4, wherein the base plate, the wall portions and the two first feet are parts of the first frame part and in that second feet of the second frame part are fastened to the two first feet that bear against the roof frame.

6. The motor vehicle according to claim 5, wherein at least one of the first feet and at least one of the second feet are fastened to the roof frame by a common screw.

7. The motor vehicle according to claim 5, wherein the rail is on the second frame part and configured to cross the wall portions.

8. The motor vehicle according to claim 7, wherein a connecting piece rests on an upper edge of one of the two first feet between the rail and one of the second feet.

9. The motor vehicle according to claim 1, wherein the rail is unitarily connected to the wrapped-around clamping strap.

10. The motor vehicle according to claim 1, wherein one of said airbags extends along a pillar of the body.

\* \* \* \* \*